(No Model.) 2 Sheets—Sheet 1.

J. G. BAILEY.
TRICYCLE.

No. 285,205. Patented Sept. 18, 1883.

Witnesses.
Lewis Tomlinson
F. B. Fetherstonhaugh

Inventor.
J. G. Bailey
by Donald C. Ridout
Attorney (No Model.)  
2 Sheets—Sheet 2.

J. G. BAILEY.
TRICYCLE.

No. 285,205. Patented Sept. 18, 1883.

Witnesses.  
Lewis Tomlinson  
J. B. Fetherstonhaugh

Inventor.  
J. G. Bailey  
by Donald C. Ridout  
Attorneys.

N. PETERS. Photo-Lithographer, Washington, D. C.

UNITED STATES PATENT OFFICE.

JAMES G. BAILEY, OF PATTERSON, ONTARIO, ASSIGNOR OF ONE-HALF TO RICHARD THORNE, OF TORONTO, CANADA.

TRICYCLE.

SPECIFICATION forming part of Letters Patent No. 285,205, dated September 18, 1883.

Application filed April 3, 1883. (No model.)

*To all whom it may concern:*

Be it known that I, JAMES GAGE BAILEY, a subject of the Queen of Great Britain, residing at the village of Patterson, in the county of York, in the Province of Ontario, Dominion of Canada, have invented certain new and useful Improvements in Tricycles, of which the following is a specification.

The object of the invention is to produce a tricycle the rider of which will enjoy a movement similar to that enjoyed by the rider of a horse; and it consists, essentially, in supporting the rider's seat upon a jointed frame connected at one end with the driving-axle, and at the other end with the front frame of the machine, the stirrups provided for the rider being carried on a frame jointed like the frame supporting the rider's seat, and correspondingly connected to the front frame and driving-axle of the machine.

Figure 1:
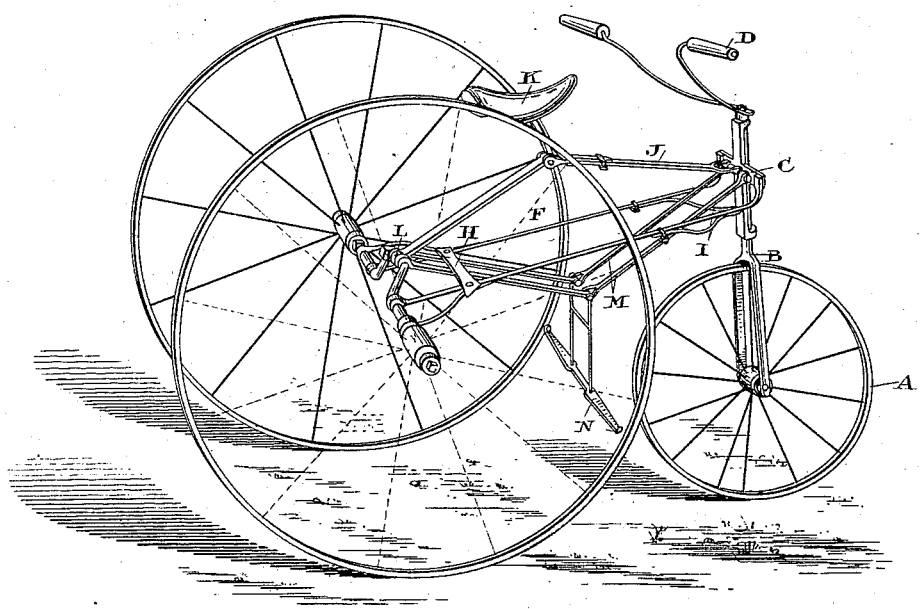
Figure 2:
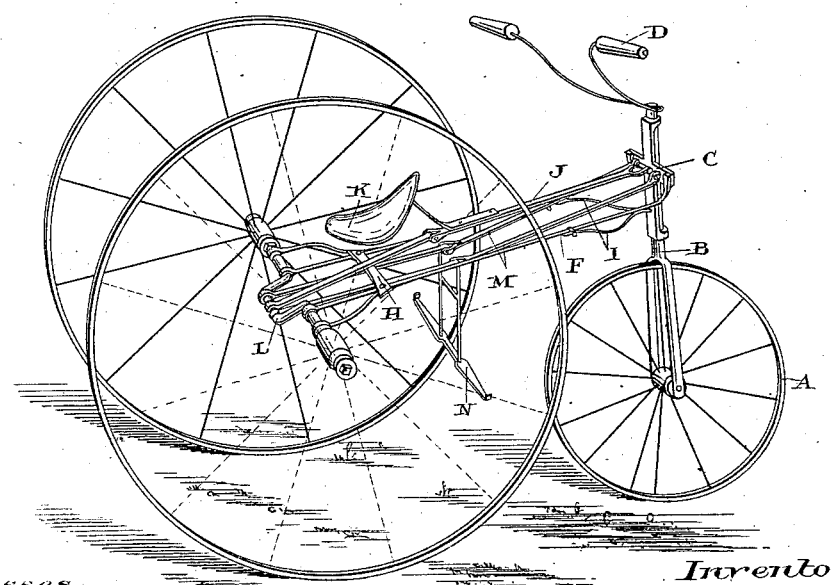
Figure 3:
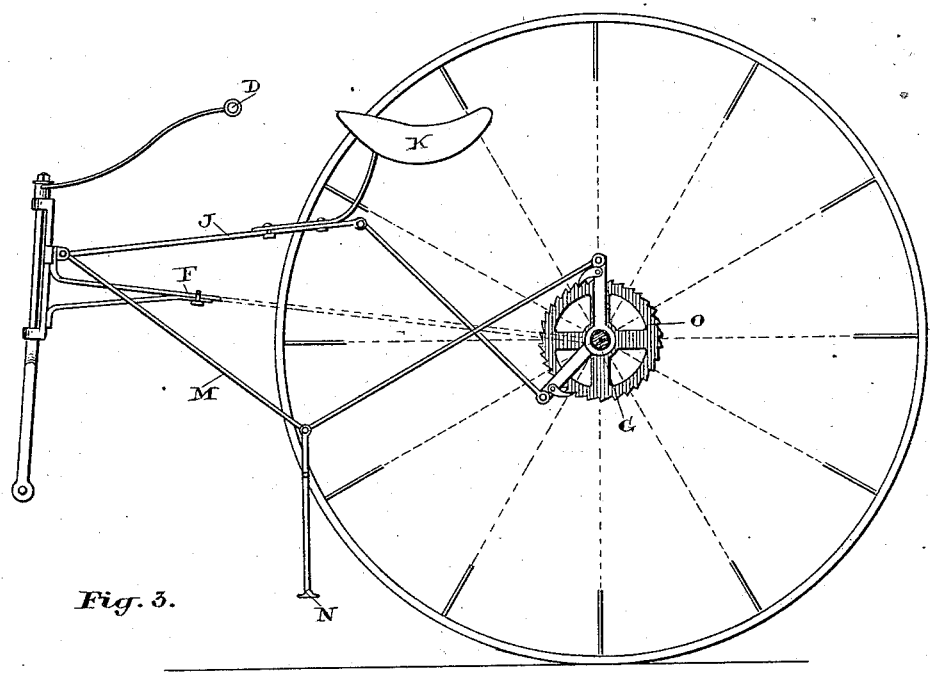
Figure 4:
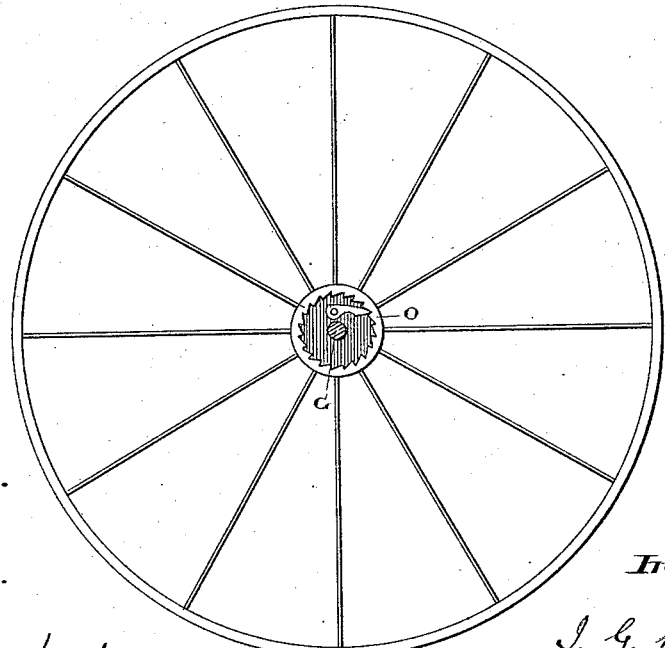

Figure 1 is a perspective view of my improved tricycle, showing the arrangement of parts as they will appear when the weight of the rider upon the seat is to be utilized for propelling the tricycle. Fig. 2 is a similar view of the machine as it will appear when the weight of the rider is to be directed through the stirrups for propelling the tricycle. Both these figures show the tricycle with the crank on the driving-axle. Fig. 3 shows the construction of the machine when altered to connect with a ratchet-wheel applied to the driving-shaft instead of a crank. Fig. 4 is a detail showing the manner of connecting the hubs of the wheel to the driving-axle.

In the drawings like letters of reference indicate corresponding parts in each figure.

A is the front or guiding wheel, held in suitable bearings formed on the forked spindle B. This spindle passes through suitable bearings made in the T-shaped front frame, C, which frame rests on a shoulder formed on the spindle B. Handles D are attached to the spindle B, and are provided for the purpose of turning the spindle in its journal in order to guide the machine.

F are rods extending from each side of the T-head of the frame C, to which they are rigidly fastened, and extend back to the driving-axle G, upon which their bifurcated ends are journaled, as shown.

H is a cross-plate bracing the rear ends of the rods F, the front ends of which are similarly braced by the forked brace I, which is rigidly bolted to the front frame, C, as indicated.

J is a bar or frame hinged to the frame C, and extending back to the point where the rider should be seated, the seat K being attached to this frame.

Immediately below the seat K the frame J is jointed, extending thence to the crank L.

M is a frame, the front end of which is hinged to the frame C, while its rear end is journaled upon the crank L, the stirrups N being suspended from the joint in the frame M, as indicated in the drawings.

Having now described the general construction of my improved tricycle, a few words will suffice to explain its operation.

When the rider is seated upon the seat K and the jointed frames J and M are extended apart, as shown in Fig. 1, he permits his weight to be carried by the seat, which action will cause the frames J and M to approach each other till they assume the position shown in Fig. 2, when the rider throws his weight upon the stirrups N, which action once more separates the frame, the said frame resuming its position shown in Fig. 1, when the previous operation is repeated, the crank L, connected to the driving-shaft, being operated so as to cause the said crank to revolve.

Although I think the simplest form of construction will be that illustrated in Figs. 1 and 2, a similar effect can be produced by journaling loosely on the driving-axle G cranks, as shown in Fig. 3, and providing the said cranks with ratchet-pawls arranged to engage with a ratchet-wheel, O, which is keyed to the axle G.

In order to enable the tricycle to be readily turned, the hubs of the main wheels may be connected to the driving-axle G by a pawl and ratchet, connected as indicated in Fig. 4. As I do not claim anything original in this form of connection between the axle and the wheel, it is not necessary to describe it, the drawings being sufficient to indicate my intention, which is to use the ordinary pawl-and-ratchet connection commonly used in reaping-machines.

What I claim as my invention is—

1. In a tricycle, and in combination with a front cross-frame, as C, and the crank-axle connected by rods, as F, a duplex jointed frame, each part being hinged to the front cross-frame at one end and to a driving-crank at the other, the upper part carrying the seat of the rider near its joint or hinge, and the lower part carrying the stirrups similarly located, as herein set forth.

2. In a tricycle, and in combination with the frame and wheels thereof, the seat K and the jointed frame J, one end of which is hinged to the front frame, C, and the other end to the crank on the driving-axle G, substantially as and for the purpose specified.

3. In a tricycle, and in combination with the wheels, frame, and seat thereof, the stirrups N and the jointed frame M, one end of which is hinged to the front frame, C, and the other end to the crank on the driving-axle G, substantially as and for the purpose specified.

J. G. BAILEY.

Witnesses:
C. CLINTON BALDWIN,
F. BARNARD FETHERSTONHAUGH.